Feb. 24, 1959　　　　F. X. LAMB　　　　2,875,411
ELECTRICAL INSTRUMENT WITH A DRUM INDICATING DIAL
Filed May 20, 1954　　　　　　　　　　　　3 Sheets-Sheet 1
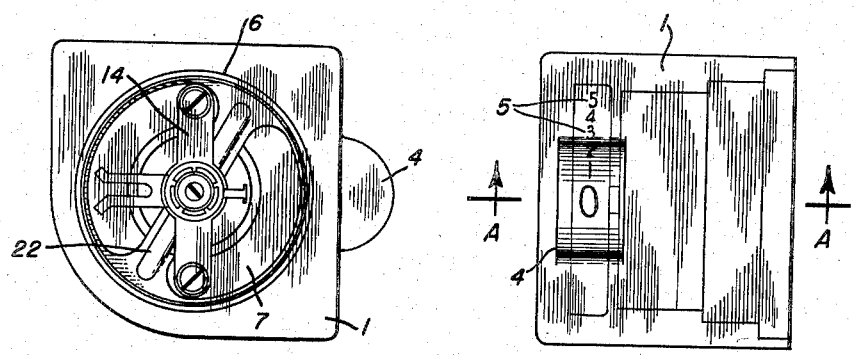
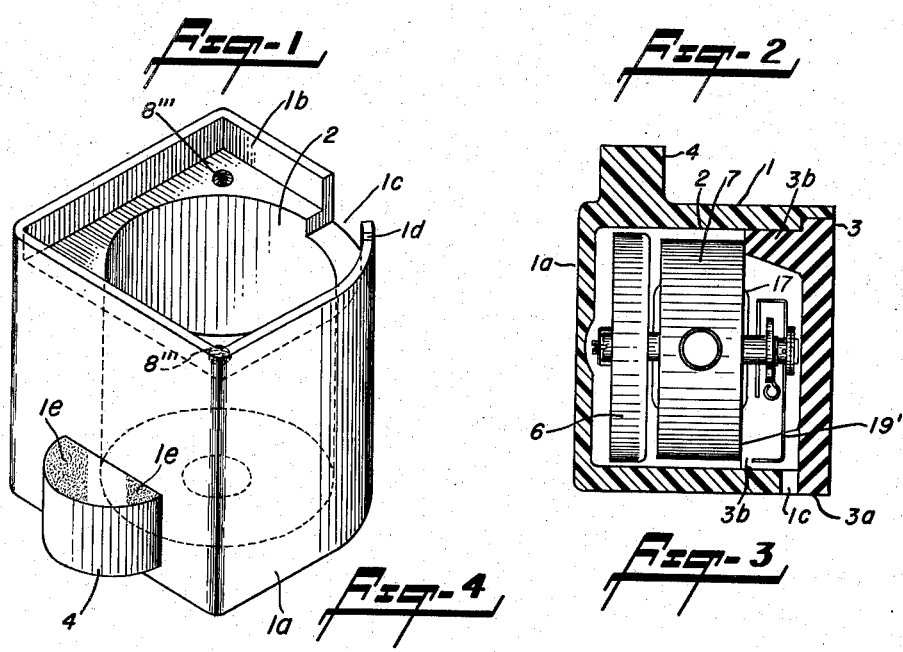
FRANCIS X. LAMB
INVENTOR.
BY
Rudolph J. Junick
ATTORNEY

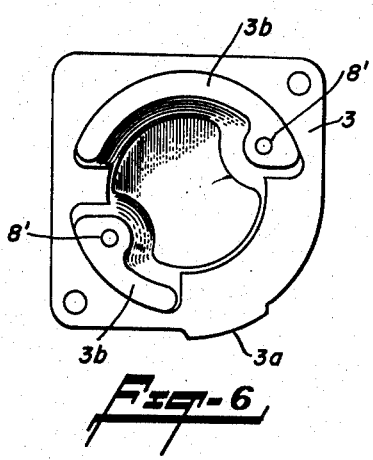
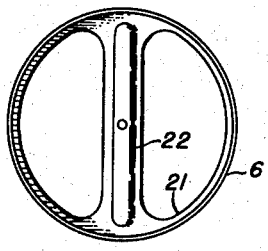
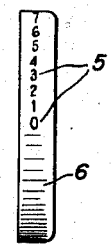
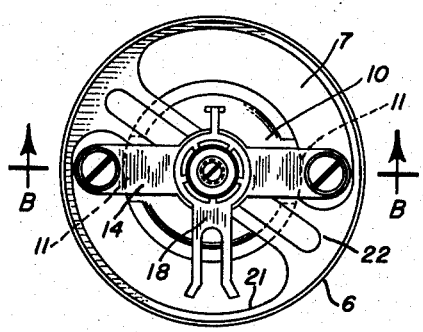
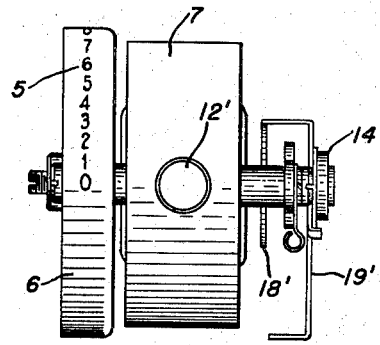
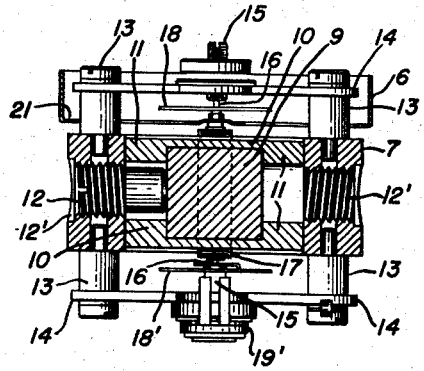
FRANCIS X. LAMB
INVENTOR.

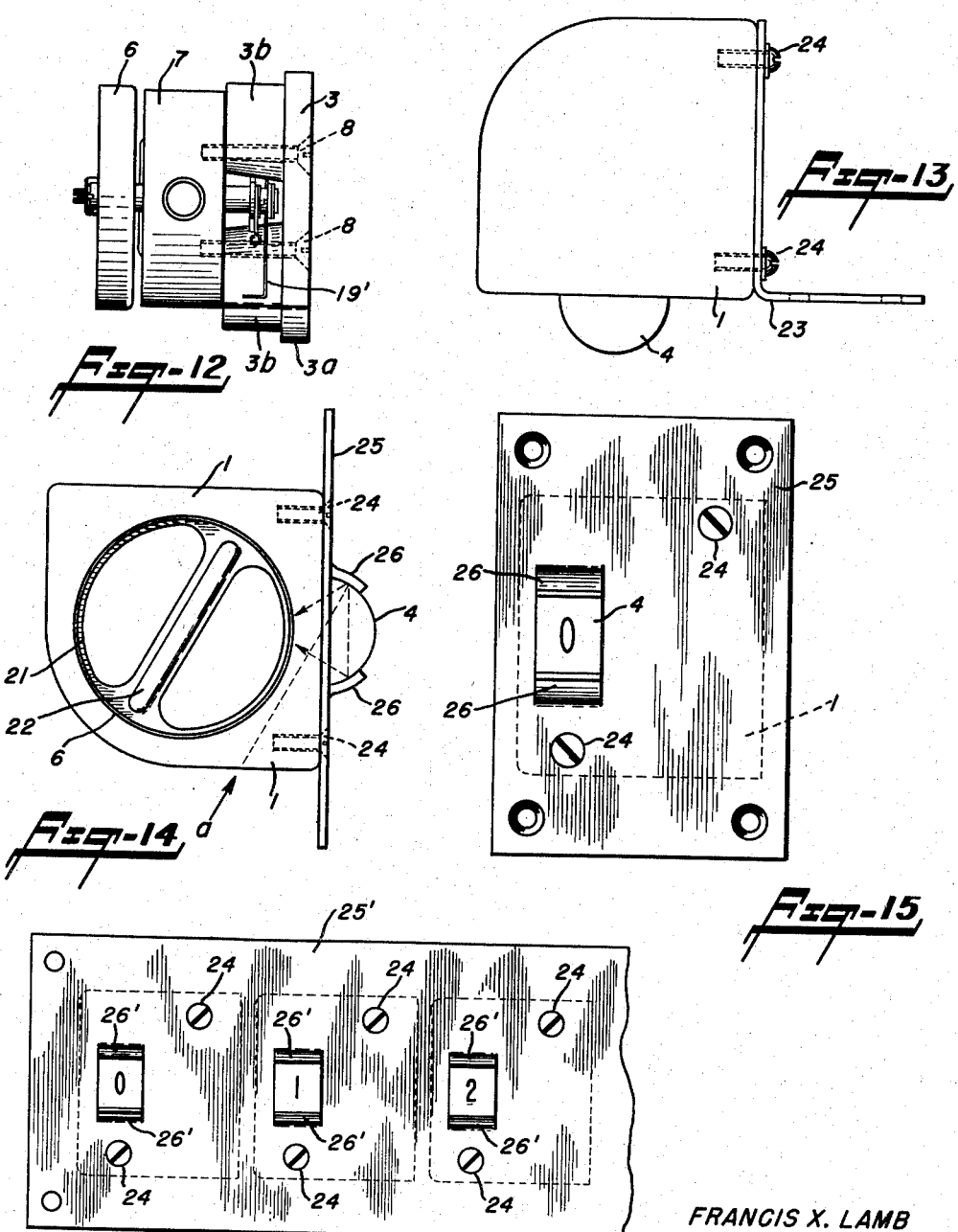

United States Patent Office 2,875,411
Patented Feb. 24, 1959

2,875,411

ELECTRICAL INSTRUMENT WITH A DRUM INDICATING DIAL

Francis X. Lamb, East Orange, N. J., assignor, by mesne assignments, to Daystrom, Incorporated, Murray Hill, N. J., a corporation of New Jersey Application May 20, 1954, Serial No. 431,195

6 Claims. (Cl. 324—151)

This invention relates to an electrical measuring instrument having a drum indicating dial, and more particularly to instruments of small size which may be compactly mounted on an elongated panel.

Conventional electrical measuring instruments have moving systems which displace a pointer along an arcuate or circular scale. In many applications of electrical measuring instruments, however, a continuously visible calibrated scale is not desirable and it would be preferable to have an indicating system which affords a simple, unambiguous display of the instantaneous character of a variable condition related to the instantaneous magnitude of the electrical current actuating the moving system of the instrument.

An object of this invention is the provision of electrical indicating instruments of simple construction and small size which include a cylindrical or drum type of indicating dial.

An object of this invention is the provision of an electrical instrument having a rotatable drum dial carrying markings and including a transparent housing having an integral magnifying lens window for viewing the significant marking on the dial.

An object of this invention is the provision of an electrical instrument of the permanent magnet-movable coil type in which a bridge for supporting one movable coil bearing is supported on posts fixed to the magnetic structure and the movable coil carries a drum type indicating dial of larger diameter than, and encircling, the bridge and bridge-supporting posts.

An object of this invention is the provision of an instrument comprising a base supporting the instrument mechanism including a rotatable drum dial carrying markings, a transparent cover secured to the base to complete the instrument housing, said cover including an integral magnifying lens window for viewing the significant marking on the dial, and a mounting plate secured to the cover, said plate including arcuate flanges forming a socket for receiving the lens window and the inner surfaces of the flanges being adapted for reflecting light rays to illuminate that portion of the drum dial alined with the lens window.

These and other objects and the advantages of the invention will be apparent from the following specification when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 1 is a side elevation of an electrical measuring instrument embodying the invention;

Figure 2 is a front view of the same;

Figure 3 is a sectional view of the instrument casing as seen on the plane indicated by line A—A of Figure 2, the instrument mechanism being shown in elevation;

Figure 4 is a perspective view of the transparent instrument case;

Figure 5 is a bottom plan view of the base which supports the entire instrument mechanism;

Figure 6 is a top plan view of the base;

Figures 7 and 8 are end and side elevations, respectively, of the indicating drum;

Figure 9 is an end elevation, on a somewhat larger scale, of the assembled instrument mechanism as seen before insertion in the instrument case;

Figure 10 is a side elevation of the same;

Figure 11 is a central section through the assembled mechanism as seen on the plane of line B—B of Figure 9;

Figure 12 is a side elevation similar to Figure 10 but showing the mechanism mounted on a base and drawn to a somewhat smaller scale;

Figure 13 is a side view of an instrument case and mounting bracket;

Figure 14 is a side view of an instrument case and a modified form of mounting bracket;

Figure 15 is a front view of the Figure 14 arrangement; and

Figure 16 is a front view of a plurality of instruments on an elongated mounting plate of the type shown in Figures 14 and 15.

As shown in Figures 1–4 of the drawings, the instrument case 1 is a molded block of a transparent plastic such as Lucite, having a cylindrical bore 2 for the reception of an electrical instrument mechanism mounted on a plastic base 3 and an integral semi-cylindrical projection 4 constituting a lens window for viewing the numeral graduations 5 on the drum indicating dial 6 of the instrument.

A wall 1a closes the end of the bore 2 adjacent the window 4, and the opposite end of the case 1 has a depending flange 1b for the flush reception of the instrument base 3, the flange 1b being interrupted by a relatively deep notch 1c into which an arcuate projection 3a of the base fits for proper positioning of the drum dial 6 with relation to the window 4, and a narrow notch 1d for the entrance of the instrument terminal connections, not shown, into the case.

The lens window 4 constitutes in effect the fiducial mark or "pointer" associated with the indicating drum 6 and the wall of bore 2 of the transparent case 1 is provided with spaced frosted areas 1e which restrict the enlarged image developed by the lens 4 to a clear view of only that circumferential portion of drum 6 which bears the single graduation indicative of the measured displacement of drum 6 from its zero position.

The instrument is of the magnetized core type and includes a tubular yoke 7 of soft iron seated on the thickened arcuate portions 3b of the base 3 and secured thereto by screws 8, see Figures 3 and 12. These screws pass through the holes 8' formed in the base as shown in Figures 5 and 6. It is here pointed out that the complete, assembled instrument mechanism is supported on the base 3 and that the insertion of the transparent case 1 over the mechanism completes the instrument housing; the base being secured to the case by screws passing through the base holes 8", Figure 5, and into alined threaded holes 8''' formed in the case, Figure 4.

Reference is now made to Figures 9–11 for a description of the instrument mechanism. The transversely magnetized core 9 is positioned axially of the yoke 7 by means of caps 10 with cylindrical pockets opening toward one another and of a diameter corresponding with that of said core. These caps are of non-magnetic material and press-fitted upon the ends of the core 9. They have diametrically opposed ears 11 with end surfaces accurately ground to fit within the bore of the yoke 7. The magnet core 9 is anchored within the yoke by a heavy set screw 12 which is threaded into a bore 12' of the yoke to bear against the core in the diametrical plane of the ears 11. It is preferred to provide diametrically opposed threaded bores 12' in the yoke but it is apparent that only one set screw 12 is sufficient to secure the core within the yoke. In such case a soft-iron screw may be threaded into the other bore 12' to serve as a magnetic shunt for the control of the deflection characteristics of the instrument.

Studs, posts or structural members 13 are mounted in the opposite faces of the yoke to support bridges 14 in which are mounted bearing screws 15 for the staffs 16 of the wire wound generally rectangular movable coil 17, which surrounds the core 9, with its longer sides movable in the space between it and the yoke 7. The conventional restoring springs 18, 18' of the movable system are supported from the bridges by spring abutments 19, 19', the end of spring abutment 19' being located adjacent the notch 1c of the case 1 to serve as a zero corrector, see also Figure 3.

The drum dial 6 is of thin sheet metal, preferably aluminum, for light weight and is reinforced by an internal flange 21. A bar 22 is integral with and extends diametrically of the flange for mounting the dial on the outer staff 16 of the instrument, the bar being preferably bent transversely to provide a longitudinal corrugation, as shown in Figure 7, for greater rigidity and leaving elongated apertures on either side for the passage of the posts 13. The periphery of the dial 6 surrounds the outer bridge 14 and its supporting posts 13, the openings on either side of the bar 22 providing spaces for the passage of said posts, thus locating its graduations 5 closely adjacent the lens window of the case which affords a magnified image of the significant dial graduation, see Figure 2.

As shown in Figure 13, the encased instrument may be mounted on a panel or base, not shown, by means of an angle bracket 23 fastened to the case 1 by screws 24 threaded into tapped openings in a flat wall of the case 1.

Alternatively, the instrument can be mounted on a relatively thin flat plate 25 as shown in Figures 14 and 15. Such mounting plate preferably includes arcuate flanges 26 pressed outwardly therefrom to form a partial socket conforming to the shape of the lens window 4 when case 1 is secured by screws 24 to the rear face of the plate. The opposed ends of the flanges 26 are spaced apart to limit the field of view of the drum dial 6 to the arcuate length of a single graduation, and the inner surfaces of the flanges 26 are preferably painted white for the better illumination of the visible portion of dial 6 by the reflection of light entering the transparent case 1 in the direction of arrow a, see Figure 14. It will be understood that external illumination can be furnished by a small lamp disposed to direct light rays along the arrow a.

In the case of a digital computer for which the illustrated instrument is particularly adapted, a single elongated panel 25' with a series of opposed arcuate flanges 26' may be provided for the side-by-side mounting of a number of the described drum dial instruments, as shown in Figure 16.

The described measuring instruments are of small size and may be closely arranged to display values in the several digital orders without fear of interference between the fields of the different instruments since they are self-shielding due to magnetized core and surrounding soft iron yoke construction.

Having now described my invention in detail in accordance with the patent statutes, various changes and modifications will suggest themselves to those skilled in this art and it is intended that such changes and modifications shall fall within the spirit and scope of the invention as recited in the following claims.

I claim:

1. An electrical measuring instrument comprising a tubular yoke of soft iron, a transversely charged cylindrical permanent magnet core co-axially arranged within said tubular yoke and spaced radially therefrom, a coil of rectangular form surrounding said core, bearing means comprising studs projecting from each end of said yoke and supporting a bridge at each end of and mounting said coil for arcuate movement in the radial gap between said core and yoke, and an indicating drum secured to said coil inwardly of a bearing means at one end of said coil, said drum having a graduated peripheral portion of greater diameter than and extending outwardly and surrounding said bearing means, the means securing said drum to said coil having elongated apertures on either side for passage of said studs, an instrument base, and means securing said base to said tubular yoke at the end thereof remote from said indicating drum.

2. An electrical measuring instrument as recited in claim 1, in combination with a case secured to said base and housing said instrument.

3. An electrical measuring instrument as recited in claim 2, wherein said case includes a lens window affording an enlarged image of the graduated periphery of said indicating drum.

4. An electrical measuring instrument comprising a magnetic field system, a moving coil, means supporting said coil for arcuate movement with respect to said magnetic field system in accordance with coil current, an indicating drum secured to one end of said moving coil and bearing graduations on a surface thereof, and a transparent plastic case housing said instrument, said case having an integral lens window for viewing the graduated surface of said indicating drum at the portion thereof displaced a measured distance from the zero position by the coil current, wherein said lens window is semi-cylindrical to afford an enlarged image of the graduated surface of said indicating drum and projects from a flat surface of said case, in combination with a mounting plate having a flat rearward surface against which said flat surface of the case may be seated, and arcuate flanges projecting forwardly from the mounting plate to form a partial socket for receiving the lens window of said case, said flanges having opposed ends spaced apart to afford a view of said displaced portion of said indicating drum.

5. An electrical measuring instrument as recited in claim 4, wherein the inner surfaces of said arcuate flanges are reflective to direct light reaching the same towards that portion of said indicating drum visible between the opposed ends of said flanges.

6. An electrical measuring instrument comprising a tubular yoke of soft iron, a transversely charged cylindrical permanent magnet, non-magnetic means axially spaced, each with a pocket snugly receiving an end of said cylindrical magnet and each having oppositely directed radial projections extending along the diameter of the bore of said yoke for positioning said cylindrical magnet axially of said yoke, means rigidly anchoring said cylindrical magnet axially within said yoke and spaced therefrom by said radial projections, a rectangular coil coaxial with said cylindrical magnet, with its longer sides in the space between the cylindrical magnet and said yoke, bearing means supporting said coil for arcuate movement in said space, said bearing means comprising a staff secured to and projecting from each end of said coil, a pair of studs secured to and projecting from each end of said tubular yoke, bridges supported on the respective pairs of studs and spaced thereby from the respective ends of said yoke, bearings for said staffs mounted in the respective bridges, and an indicating drum having a cylindrical portion bearing graduations, a reinforcing flange inturned at one end of said cylindrical portion, and a bar integral with said flange and extending diametrically of said cylindrical portion, said drum having elongated apertures on either side of said bar for reception of said studs, the center of said bar being secured to the staff at one end of said coil, with the cylindrical portion of said indicating drum encircling the adjacent bridge.

References Cited in the file of this patent

UNITED STATES PATENTS

| | | |
|---|---|---|
| 1,712,560 | Huggins | May 14, 1929 |
| 1,920,764 | Nickle | Aug. 1, 1933 |
| 2,346,521 | Triplett | Apr. 11, 1944 |
| 2,408,060 | Grace | Sept. 24, 1946 |
| 2,552,981 | Lamb | May 15, 1951 |
| 2,607,812 | Lederer | Aug. 19, 1952 |
| 2,612,132 | Triplett | Sept. 30, 1952 |
| 2,719,267 | Kunz | Sept. 27, 1955 |
| 2,738,672 | Smith | Mar. 20, 1956 |

FOREIGN PATENTS

| | | |
|---|---|---|
| 825,576 | Germany | Dec. 20, 1951 |